Feb. 22, 1966    W. R. PATTERSON ETAL    3,237,095
TEST DEVICE FOR IMPACT AND CENTRIFUGAL SWITCHES
UTILIZING A MAGNETIC FIELD TO SIMULATE
INERTIAL FORCES
Filed Dec. 27, 1963

INVENTORS,
WILLIAM R. PATTERSON
ARNOLD STECKLER 3,237,095
TEST DEVICE FOR IMPACT AND CENTRIFUGAL SWITCHES UTILIZING A MAGNETIC FIELD TO SIMULATE INERTIAL FORCES
William R. Patterson, Rockville, Md., and Arnold Steckler, Washington, D.C., assignors to the United States of America as represented by the Secretary of the Army
Filed Dec. 27, 1963, Ser. No. 334,058
1 Claim. (Cl. 324—28)
(Granted under Title 35, U.S. Code (1952), sec. 266)

The invention described herein may be manufactured and used by or for the Government of the United States of America for governmental purposes without the payment to us of any royalty thereon.

This invention relates to testing devices, and more particularly to a magnetic test device for impact and centrifugal force operated fuze switches.

A very common element in the electromechanical fuzes are force actuated switches. Various mechanical switches are commonly used both to provide safety and arming of the fuze, and also to initiate detonation of the fuze. Such switches are often designed to be operated by inertial or centrifugal forces. Obviously, for the production testing of assembled fuzes it is desirable and necessary to check the operation of these switches in a fully assembled fuze. The prior art has taught the use of centrifuge testing for these switches in assembled fuzes. Such test devices, while normally satisfactory, are bulky, expensive, and difficult to instrument.

It is therefore, an object of this invention to provide a novel fuze testing device which is fast, reliable, low cost, and can be used to test fully assembled production fuzes.

Another object of this invention is to provide a novel fuze test device in which the fuze may be quickly and easily positioned.

Another object of this invention is to allow the testing of random samples of fuzes. Previously, in order to test the fuze thermal power supplies, a specially wired lot of fuzes, having shorted impact switches, was necessary. The specially wired fuzes may have been more carefully prepared than those in the general production run. This invention will close the impact switch of any production run fuze of this variety of fuzes and thus allows for random sampling at the discretion of an inspector.

Still another object of this invention is to provide a novel electromagnetic fuze test device which is rugged enough to destructively test production fuzes.

One further object of the invention is to provide an electromagnetic test device which can test fully assembled fuzes which have ferrous or other kinds of metal housings.

These and other objects of this invention are accomplished through the use of a magnet having a low permeability core with a small air gap therein. Because of the discontinuity in the core, the high density magnetic field in the low permeability core "bulges" into the space in the region of the air gap, producing a high magnetic field gradient. The fuze to be tested is placed close to the air gap. The fuze switch is positioned in such a manner as to place the inertial moving member at a point of large magnetic field gradient in the "bulge" field. The inertial members are made of magnetic material and the force on these members, caused by the magnetic gradient, simulates the inertial forces which would be experienced in actual operation, urging them toward their "function" position. The closing of the switch will cause the fuze to detonate in the case of sample production testing.

The specific nature of the invention, as well as other objects, aspects, uses and advantages thereof, will clearly appear from the following description and from the accompanying drawing, in which.

Figure 1:
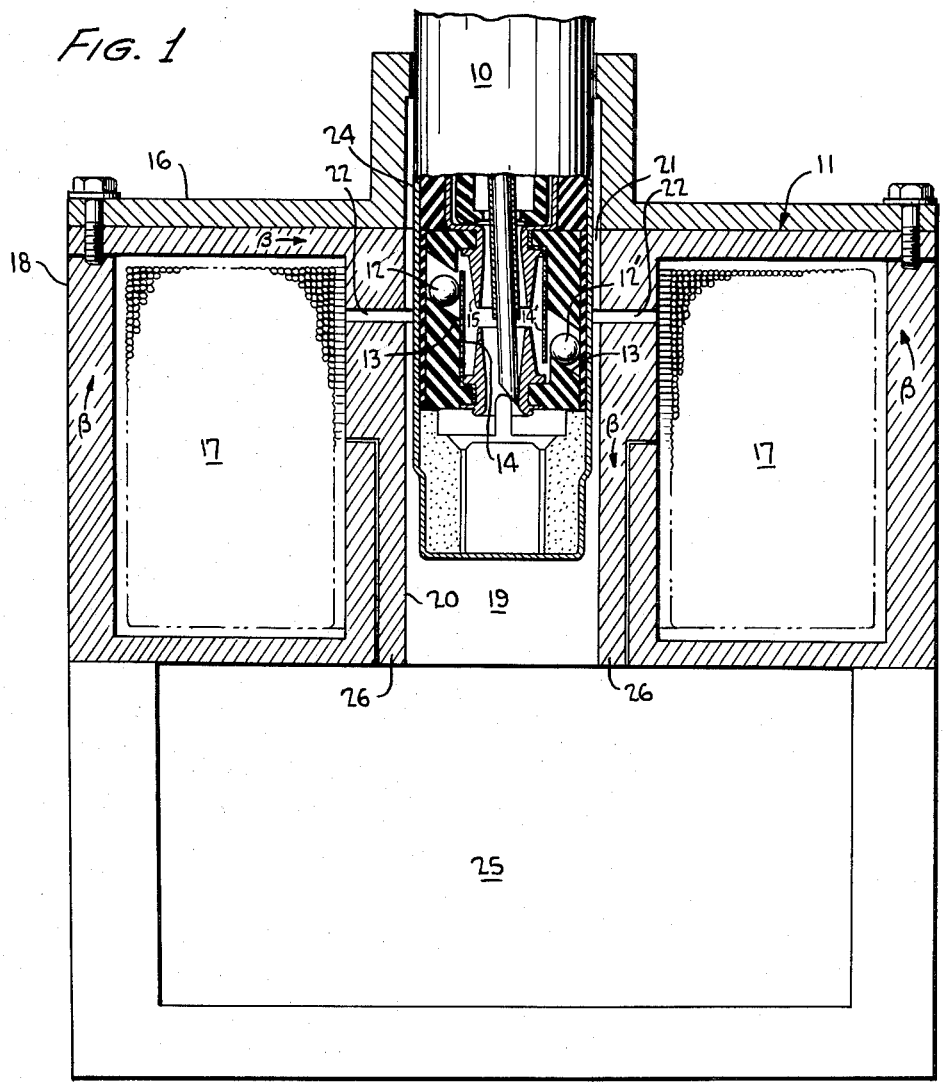
FIG. 1 shows a partial sectional view of a magnetic test device of this invention with a typical fuze in place in the test device.

While the specific embodiment shown in FIG. 1 is particular to a single fuze, it will be apparent to those skilled in the art that the principles involved are not so limited, and these principles may be adapted to test any of a number of generally similar fuzes.

In FIG. 1 there is a fuze 10 in a test device 11, which test device forms this invention. The fuze shown is of the Army M217-type. The designed operation of this fuze is: upon impact an inertial member 12 will move along inclined plane 13 and force a leaf spring 14 against a contact 15. This completes an electrical detonating circuit, and a properly constructed fuze will function. The fuze is generally cylindrical in shape with a plurality of inertial members 12, 12' and leaf springs 14, 14' provided around its periphery in order to make the fuzes sensitive to impact in any direction. In the fuze 10, as shown, the left hand inertial member 12 will close if impact is on the bottom, and 12' will close if impact is on the top.

In the specific embodiment shown in FIG. 1, the test device has a doughnut shaped electromagnet generally indicated at 11, which consists of a coil of relatively heavy wire 17 surrounded by a low permeability core 18. The core 18 is continuous and fits tightly around the coil 17 in order that the magnetic flux will be efficiently concentrated in this core. The central portion 19 of the generally doughnut shaped magnetic core forms a cavity to receive the fuze 10, and the geometric configuration of the cavity 19 should be such that it closely conforms to the geometry of the fuze to be tested. In the case of the fuze shown, the cavity 19 is cylindrical in shape. The clearance indicated at 21 between the outer casing 24 of the fuze and the inner surface 20 of the core 18 should be as small as possible consistent with easy insertion and removal of the fuze to be tested.

There is an air gap 22 in the core 18. The fuze 10 is held in the cavity 19 by means of a jig 16, and the inertial members 12 are located away from the center plane of the gap 22 and are urged toward the center plane of the air gap 22 when the coil is energized. Therefore, those inertial members 12 located above the center plane are urged down toward and away from the gap 22, and those members 12 located below are urged up and away from the gap 22.

Figure 2:
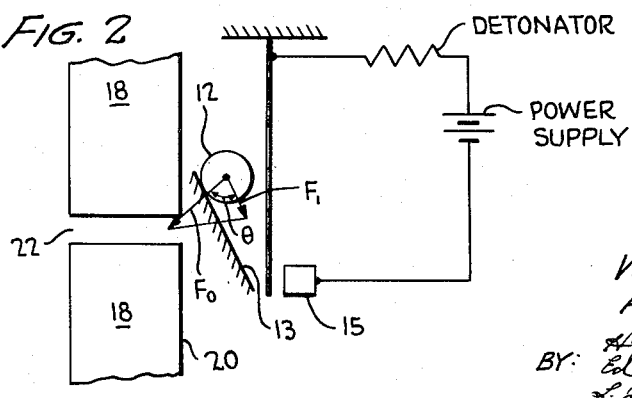
FIG. 2 is a schematic detail view showing the forces on the inertial member.

FIG. 2 shows, schematically, the forces on the inertial member 12. The force $F_0$ exerted on the member 12 by the magnetic field in the air gap 22 is in the direction of maximum strength of the field. This force is given by the equation:

$$F_0 = (KH) \nabla H \tag{1}$$

where, $(KH)$ = the induced moment of the member 12
$\nabla H$ = the magnetic field gradient The switch closing force is $F_1$ which is:

$$F_1 = F_0 \cos \theta$$

where $\theta$ = the angle between $F_0$ and the plane 13.

The design of the air gap 22 is critical to the proper operation of the test device of this invention. The magnetic field in the core 18 must "bulge" into the fuze receiving cavity 19 creating a magnetic field gradient across the inertial members 12 which tends to urge the members 12 against leaf springs 14 closing the circuit. In order to produce the necessary high gradient in the region of the inertial member 12 with a reasonably sized magnetizing coil 17, it is necessary that the over-all reluctance of the magnetic path of core 18 be low. This requires that the gap 22 be narrow. However, if the gap 22 is too narrow, the magnetic flux passes substantially directly from one side of the gap to the other, and does not "bulge" sufficiently far into the cavity 19 to create the necessary magnetic field gradient across the inertial member 12 to cause it to move. On the other hand, if the gap 22 is too wide, the total reluctance of the magnetic circuit which includes core 18 and gap 22, is so great that the total flux is diminished to a point where the flux gradient across the inertial member 12 is insufficient to move it. For the Army M217-type fuze such as represented by FIG. 10, a test device having a magnetic field on the order of 750 gausses at the inertial member, with an air gap of 0.047 inch, is satisfactory.

Immediately below the test device 11, in the embodiment shown, there is an explosion chamber 25. The test device 11, as will be apparent to those skilled in the art, can easily be constructed to withstand the explosion of the detonator in the fuze 10. The force of the explosion is dissipated in the chamber 25. This allows destructive testing of production models if desired. When destructive testing is desired, that portion of the core 18 adjacent the fuze 10, which forms the cavity 19 is subjected to wear, and for this reason, a portion of the core 18 can be made in the form of a removal liner 26.

As will be apparent to those skilled in the art, the specific embodiment shown is only exemplary. Through the utilization of a "bulging" magnetic field as taught by this invention, a wide variety may be tested, since it is not necessary that the magnetic field pass entirely through the fuze. Additionally, it is possible to use a permanent magnet in place of the electromagnetic shown.

It will be apparent that the embodiments shown are only exemplary and that various modifications can be made in construction and arrangement within the scope of the invention as defined in the appended claim.

We claim as our invention:

A magnetic test device for destructive testing of impact fuzes having inertial switches comprising:
- (a) a doughnut shaped electromagnet having a centrally disposed fuze receiving cavity therethrough the geometric configuration of which closely conforms to the geometry of the fuze to be tested, said electromagnet including:
  - (1) a doughnut shaped coil of wire, and
  - (2) a low reluctance magnetic core surrounding said coil of wire such that the magnetic flux produced when a current is passed through said coil of wire is substantially concentrated in said core, said core having an air gap in that part of said core which defines said cavity, said air gap presenting a high reluctance path to all the magnetic flux concentrated in said core whereby the magnetic flux in said core is caused to bulge into said cavity, a portion of said core which defines said cavity comprising a removable liner which can be replaced whereby said device may be renewed at such intervals as may be determined by erosion of said liner caused by said testing,
- (b) a container fixedly attached to one side of said electromagnet defining an explosion chamber communicating with said cavity for receiving and dissipating the force of an explosion occassioned by the testing of a fuze, and
- (c) means attached to the other side of said electromagnet for positioning a fuze to be tested within said cavity so that said inertial switches are in close proximity to said air gap whereby the force exerted on the inertial members of said switches produced by the magnetic field gradient urges said inertial members into their function position.

References Cited by the Examiner

UNITED STATES PATENTS

| | | | |
|---|---|---|---|
| 2,469,165 | 5/1949 | Hillier | 336—178 X |
| 2,806,186 | 9/1957 | Brown et al. | 317—157 |

WALTER L. CARLSON, *Primary Examiner.*

G. L. LETT, *Assistant Examiner.*